(12) United States Patent
Bobo et al.

(10) Patent No.: US 9,505,344 B1
(45) Date of Patent: Nov. 29, 2016

(54) ILLUMINATED CIRCUIT PRINT SEAT COVER ASSEMBLY

(71) Applicants: Demetris A. Bobo, Columbia Heights, MN (US); Adrian A. Stevens, Columbia Heights, MN (US)

(72) Inventors: Demetris A. Bobo, Columbia Heights, MN (US); Adrian A. Stevens, Columbia Heights, MN (US)

( * ) Notice: Subject to any disclaimer, the term of this patent is extended or adjusted under 35 U.S.C. 154(b) by 0 days.

(21) Appl. No.: 14/682,157

(22) Filed: Apr. 9, 2015

(51) Int. Cl.
  *B60Q 3/02*  (2006.01)
  *F21V 23/00*  (2015.01)
  *B60Q 3/00*  (2006.01)
  *H05B 37/02*  (2006.01)
  *F21Y 103/00*  (2016.01)

(52) U.S. Cl.
  CPC ............. *B60Q 3/0223* (2013.01); *B60Q 3/007* (2013.01); *F21V 23/001* (2013.01); *H05B 37/0236* (2013.01); *F21Y 2103/006* (2013.01)

(58) Field of Classification Search
  CPC ... B60Q 3/0223; B60Q 3/007; F21V 23/001; H05B 37/0236; F21Y 2103/006
  USPC .................................................. 362/487, 488
  See application file for complete search history.

(56) References Cited

U.S. PATENT DOCUMENTS

| | | | | |
|---|---|---|---|---|
| 4,234,907 A | * | 11/1980 | Daniel ................ | A41D 27/085 139/420 R |
| 5,709,448 A | * | 1/1998 | Jennings ............... | B60Q 3/004 362/156 |
| 6,854,869 B1 | * | 2/2005 | Fernandez ............ | A47C 7/725 297/184.17 |
| 8,215,810 B2 | * | 7/2012 | Welch, Sr. ............ | B60Q 3/004 362/488 |
| 2001/0002169 A1 | * | 5/2001 | Reitze .................. | B60Q 3/0223 362/486 |
| 2002/0075692 A1 | * | 6/2002 | Curry .................. | B60Q 3/0223 362/488 |
| 2015/0197186 A1 | * | 7/2015 | Salter .................. | B60Q 3/0283 362/510 |
| 2015/0274068 A1 | * | 10/2015 | Falconi ............... | B60Q 3/0223 297/217.6 |

* cited by examiner

*Primary Examiner* — Laura Tso
(74) *Attorney, Agent, or Firm* — Dave Alan Lingbeck

(57) ABSTRACT

An illuminated circuit print seat cover assembly for synchronizing the lighting up of tape arranged in a pattern on the seat cover with the playing of music in the vehicle. The illuminated circuit print seat cover assembly includes a seat cover including a front sheet of material and a back sheet of material attached to one another; and a lighting assembly attached to the seat cover for displaying flashing and pulsating light with varying degrees of brightness and intensity.

12 Claims, 3 Drawing Sheets

ILLUMINATED CIRCUIT PRINT SEAT COVER ASSEMBLY

BACKGROUND OF THE INVENTION

Field of the Invention

The present invention relates to seat covers and more particularly pertains to a new illuminated circuit print seat cover assembly for synchronizing the lighting up of tape arranged in a pattern on the seat cover with the playing of music in the vehicle.

Description of the Prior Art

The use of seat covers is known in the prior art. More specifically, seat covers heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a seat back that has a back frame, a cushion pad attached to the back frame, and a massaging unit having a plurality of massaging elements. Another prior art includes a sound-controllable multistage massager equipped with LCD device comprising a massage mattress and a control device, wherein the control device comprises at least a microprocessor, a power supply device, a heating device, a sound controllable device, a motor driving device, a LCD driving device, and a key-in device. The massage mattress contains plural motors cooperative with the control device to achieve massage efficacy. Also another prior art includes a massaging apparatus utilizing a hand held controller including a microcontroller to actuate a plurality of vibrators positioned within a cushion using pulse width modulated signals. While these devices fulfill their respective, particular objectives and requirements, the aforementioned patents do not disclose a new illuminated circuit print seat cover assembly.

SUMMARY OF THE INVENTION

The general purpose of the present invention, which will be described subsequently in greater detail, is to provide a new illuminated circuit print seat cover assembly which has many of the advantages of the seat covers mentioned heretofore and many novel features that result in a new illuminated circuit print seat cover assembly which is not anticipated, rendered obvious, suggested, or even implied by any of the prior art seat covers, either alone or in any combination thereof. The present invention includes a seat cover including a front sheet of material and a back sheet of material attached to one another; and a lighting assembly attached to the seat cover for displaying flashing and pulsating light with varying degrees of brightness and intensity. None of the prior art includes the combination of the elements of the present invention.

There has thus been outlined, rather broadly, the more important features of the illuminated circuit print seat cover assembly in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new illuminated circuit print seat cover assembly which has many of the advantages of the seat covers mentioned heretofore and many novel features that result in a new illuminated circuit print seat cover assembly which is not anticipated, rendered obvious, suggested, or even implied by any of the prior art seat covers, either alone or in any combination thereof.

Still another object of the present invention is to provide a new illuminated circuit print seat cover assembly for synchronizing the lighting up of tape arranged in a pattern on the seat cover with the playing of music in the vehicle.

Still yet another object of the present invention is to provide a new illuminated circuit print seat cover assembly that enhances the beat of the music being played on the stereo by lighting up the design in concert with the beat of the music.

Even still another object of the present invention is to provide a new illuminated circuit print seat cover assembly that displays an attractive array of lighting on the seat cover during the playing of music on the stereo.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
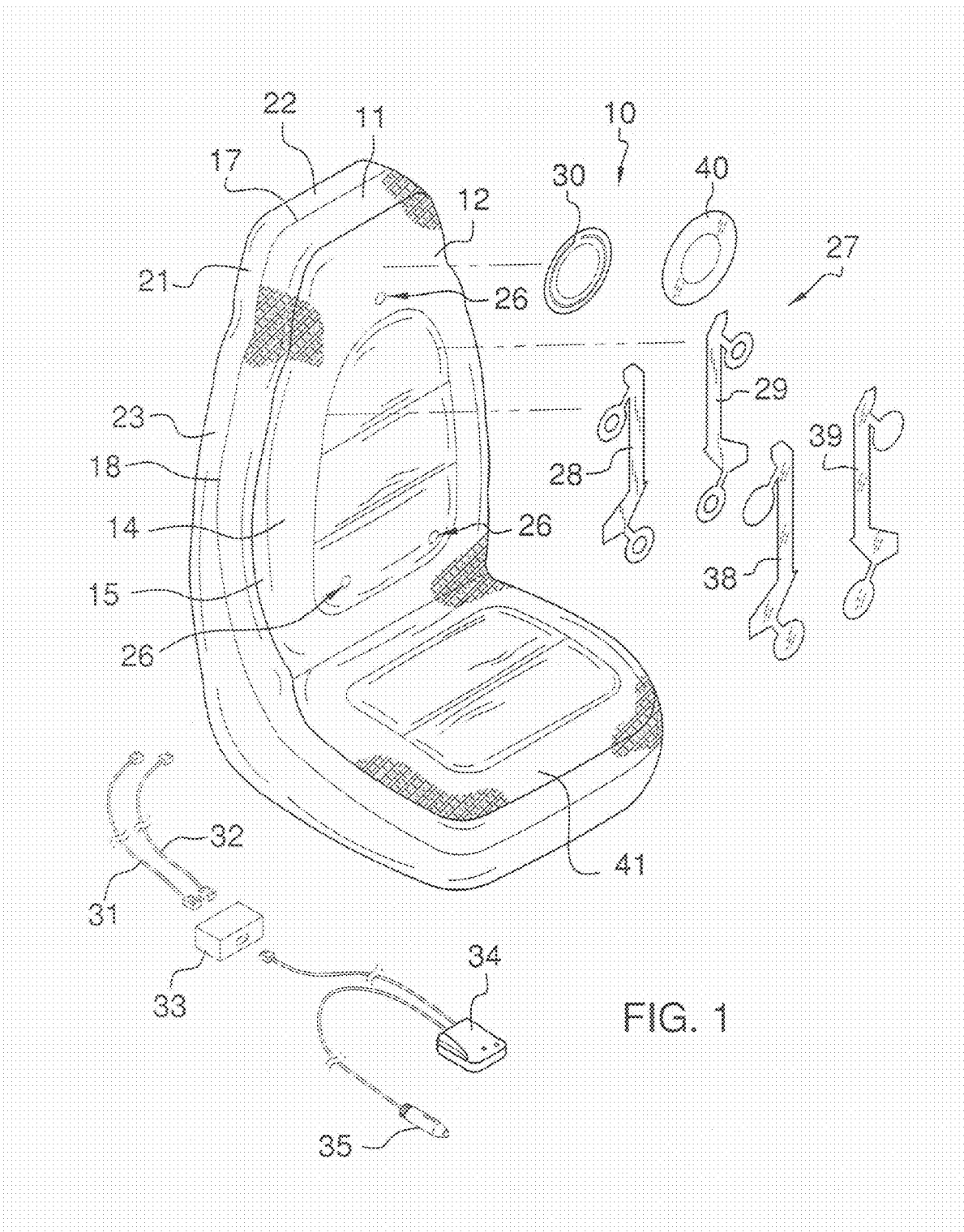
FIG. 1 is an exploded perspective view of the seat cover assembly with the wires extending on the back side of the front panel of the seat cover with illuminate tape on the front side of the front panel according to the present invention.
Figure 2:
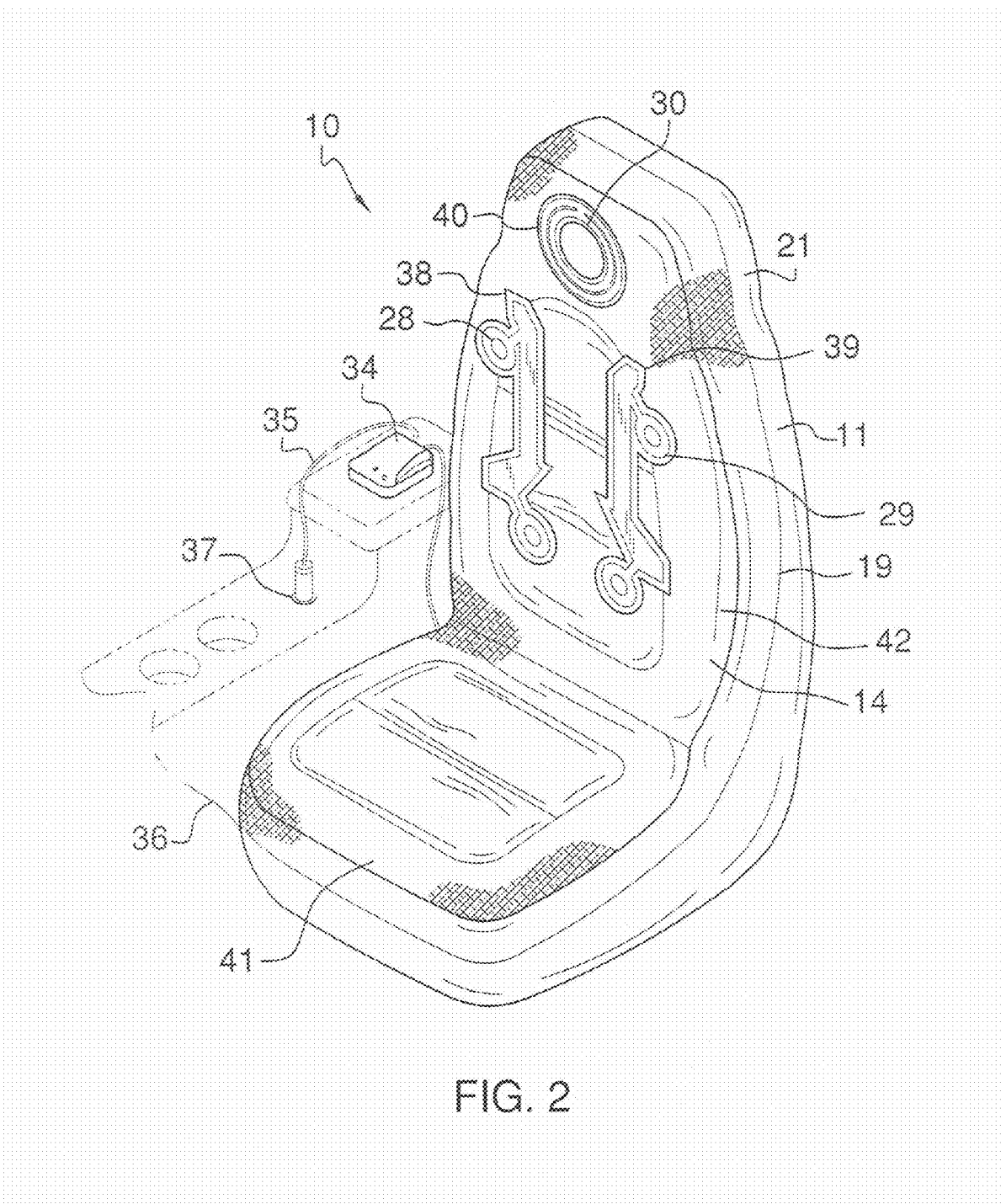
FIG. 2 is front perspective view of the seat cover assembly with a partial dotted outline of a center column for a vehicle with a cigarette lighter jack.
Figure 3:
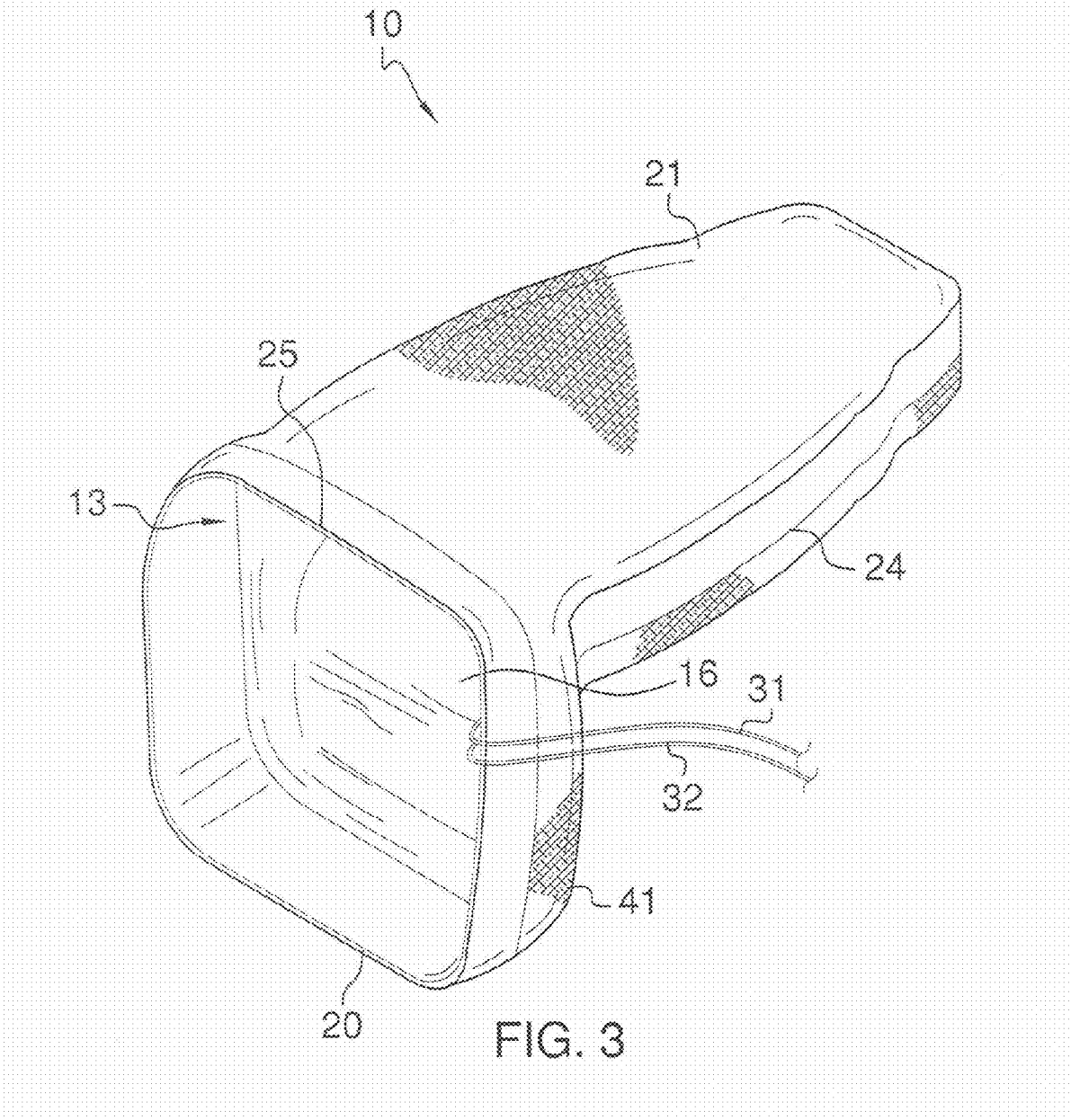
FIG. 3 is a bottom perspective view of the seat cover assembly showing the wires extending through the open bottom.

With reference now to the drawings, and in particular to FIGS. 1 through 3 thereof, a new illuminated circuit print seat cover assembly embodying the principles and concepts of the present invention and generally designated by the reference numeral 10 will be described.

As best illustrated in FIGS. 1 through 3, the illuminated circuit print seat cover assembly 10 may generally comprise a seat cover 11 including a flexible front sheet of material 14 and a flexible back sheet of material 21 both of which may be made of fabric and may be conventionally attached and sewn to one another, and may further comprise a lighting assembly 27 conventionally attached to the seat cover 11 to effect flashing and pulsating light with varying degrees of brightness and intensity. The front and back sheets of material 14, 21 may have top 17, 22, side 18, 19, 23, 24 and bottom 20, 25 edges with the front and back sheets of material 14, 21 securely attached and sewn to one another along the top and side edges 17-19, 22-24 forming the seat cover 11 having an open bottom 13 and adapted to fit about a seat 36 in a vehicle. The lighting assembly 27 may include one or more strips of electroluminescent tape 28-30 arranged in one or more particular designs and conventionally adhered with adhesive to an outer side 12 of the seat cover 11. The front sheet of material 14 may have a backrest portion 42 and a seat portion 41. The backrest portion 42 may have an outer side 15 with the one or more strips of electroluminescent tape 28-30 conventionally adhered to the outer side 15 of the backrest portion 42, and may also include one or more transparent laminated protective covers 38-40 respectively, conventionally, and securely overlaying the one or more strips of electroluminescent tape 28-30. The backrest portion 42 may also have one more holes 26 disposed therethrough and disposed respectively adjacent to the one or more strips of electroluminescent tape 28-30. The lighting assembly 27 may include one or more electrical wires 31-32 extending through the open bottom 13 of the seat cover 11 and extending through the one or more holes 26 and in conventional communication with the one or more strips of electroluminescent tape 28-30. The one or more electrical wires 31-32 may be conventionally fastened to an inner side 16 of the seat cover 11. The lighting assembly 27 may further include a sound activated inverter 34 in conventional communication with the one or more electrical wires 31-32 for converting sound to electrical current with varying degrees of current intensity which energize the one or more strips of electroluminescent tape 28-30 to emit light, flashing and pulsating in concert with the sound at varying degrees of brightness. The lighting assembly 27 may also include a cigarette lighter plug 35 conventionally connected to the sound activated inverter 34 for transmitting electrical current from a power source such as the vehicle's battery to energize the one or more strips of electroluminescent tape 28-30.

As illustrated in FIG. 2, the one or more strips of electroluminescent tape 28-30 may include strips of electroluminescent tape 28-30 spaced apart and arranged in the one or more particular designs and conventionally adhered to the outer side 15 of the backrest portion 42. The backrest portion 42 may also have holes 26 disposed therethrough with each of the holes 26 disposed adjacent to a respective one of the strips of electroluminescent tape 28-30. The lighting assembly 27 may include electrical wires 31-32 extending through the open bottom 13 of the seat cover 11 and extending through the holes 26 and in conventional communication with the strips of electroluminescent tape 28-30. The electrical wires 31-32 may be conventionally fastened to an inner side 16 of the seat cover 11. The lighting assembly 27 may further include an electrical wire splitter 33 conventionally connected to the electrical wires 31-32, and may also include the sound activated inverter 34 in conventional communication with the electrical wire splitter 33 for converting sound to electrical current with varying degrees of current intensity which energize the strips of electroluminescent tape 28-30 to emit light, flashing and pulsating in concert with the sound at varying degrees of brightness. The lighting assembly 27 may also include the cigarette lighter plug 35 conventionally connected to the sound activated inverter 34 for transmitting electrical current from the power source to energize the strips of electroluminescent tape 28-30.

In use, the user drapes the seat cover 11 over the vehicle seat 36 with the one or more strips of electroluminescent tape 28-30 facing forward of the vehicle seat 36, and plugs in the cigarette lighter plug 35 into the cigarette lighter jack 37 and adjusts the intensity of the sound activated inverter 34 which has a microphone to capture the sounds such as music played from the vehicle stereo. The sound activated inverter 34 converts the sound it receives into electrical current which is transmitted to the one or more strips of electroluminescent tape 28-30; whereupon the one or more strips of electroluminescent tape 28-30 emits light with the intensity and brightness in concert with the sound received by the sound activated inverter 34. The light may flash or pulsate in rhythm with the sound.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the illuminated circuit print seat cover assembly. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An illuminated circuit print seat cover assembly comprising:
   a seat cover including a flexible front sheet of material and a flexible back sheet of material attached to one another and adapted to fit about a seat in a vehicle; and
   a lighting assembly attached to the seat cover for displaying flashing and pulsating light with varying degrees of brightness and intensity, wherein the lighting assembly includes one or more strips of electroluminescent tape arranged in one or more particular designs and adhered to an outer side of the seat cover.

2. The illuminated circuit print seat cover assembly as described in claim 1, wherein the front sheet of material has a backrest portion and seat portion.

3. The illuminated circuit print seat cover assembly as described in claim 2, wherein the backrest portion has an outer side with the one or more strips of electroluminescent tape adhered to the outer side of the backrest portion, and also includes one or more transparent laminated protective covers respectively and securely overlaying the one or more strips of electroluminescent tape.

4. The illuminated circuit print seat cover assembly as described in claim 3, wherein the backrest portion also has one more holes disposed therethrough and disposed respectively adjacent to the one or more strips of electroluminescent tape, wherein the lighting assembly includes one or more electrical wires extending through the open bottom of the seat cover and extending through the one or more holes and in communication with the one or more strips of electroluminescent tape, wherein the one or more electrical wires are fastened to an inner side of the seat cover.

5. The illuminated circuit print seat cover assembly as described in claim 4, wherein the lighting assembly further includes a sound activated inverter in communication with the one or more electrical wires for converting sound to electrical current with varying degrees of current intensity which energize the one or more strips of electroluminescent tape to emit light, flashing and pulsating in concert with the sound at varying degrees of brightness.

6. The illuminated circuit print seat cover assembly as described in claim 5, wherein the lighting assembly also includes a cigarette lighter plug connected to the sound activated inverter for transmitting electrical current from a power source to energize the one or more strips of electroluminescent tape.

7. The illuminated circuit print seat cover assembly as described in claim 1, wherein the one or more strips of electroluminescent tape includes strips of electroluminescent tape spaced apart and arranged in the one or more particular designs and adhered to the outer side of the backrest portion.

8. The illuminated circuit print seat cover assembly as described in claim 7, wherein the backrest portion also has holes disposed therethrough with each of the holes disposed adjacent to a respective one of the strips of electroluminescent tape, wherein the lighting assembly includes electrical wires extending through the open bottom of the seat cover and extending through the holes and in communication with the strips of electroluminescent tape, wherein the electrical wires are fastened to an inner side of the seat cover.

9. The illuminated circuit print seat cover assembly as described in claim 8, wherein the lighting assembly further includes an electrical wire splitter connected to the electrical wires, and also includes a sound activated inverter in communication with the electrical wire splitter for converting sound to electrical current with varying degrees of current intensity which energize the strips of electroluminescent tape to emit light, flashing and pulsating in concert with the sound at varying degrees of brightness.

10. The illuminated circuit print seat cover assembly as described in claim 9, wherein the lighting assembly also includes a cigarette lighter plug connected to the sound activated inverter for transmitting electrical current from a power source to energize the strips of electroluminescent tape.

11. A method of using an illuminated circuit print seat cover assembly comprising the steps of:
  providing a seat cover and a lighting assembly including one or more strips of electroluminescent tape attached to the seat cover and also including a sound activated inverter connected to the one or more strips of electroluminescent tape and further including a cigarette lighter plug connected to the sound activated inverter;
  disposing the seat cover over a seat of a vehicle with the one or more strips of electroluminescent tape facing forward of the seat;
  connecting the cigarette lighter plug to a cigarette lighter of the vehicle;
  activating a sound system of the vehicle with the sound activated inverter converting sound received from the sound system to electrical current; and
  lighting the one or more strips of electroluminescent tape using the electrical current.

12. The method of using an illuminated circuit print seat cover assembly as described in claim 11, wherein the lighting the one or more strips includes variably flashing of the one or more strips of electroluminescent tape in rhythmic concert with the sound from the sound system upon the seat of the vehicle.

* * * * *